United States Patent
Black et al.

(10) Patent No.: US 8,925,829 B2
(45) Date of Patent: Jan. 6, 2015

(54) OPTICAL CODE

(71) Applicant: NCR Corporation, Duluth, GA (US)

(72) Inventors: Jonathan S. Black, Dundee (GB); Iain Mackay, Dundee (GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/664,127

(22) Filed: Oct. 30, 2012

(65) Prior Publication Data

US 2014/0117100 A1    May 1, 2014

(51) Int. Cl.
*G06K 19/06*    (2006.01)

(52) U.S. Cl.
USPC .......................................................... 235/494

(58) Field of Classification Search
CPC ................................................ G06K 19/06103
USPC ......................................................... 235/494
See application file for complete search history.

(56) References Cited

U.S. PATENT DOCUMENTS

| | | | |
|---|---|---|---|
| 2011/0303754 A1* | 12/2011 | Shinotani et al. | 235/494 |
| 2012/0206648 A1* | 8/2012 | Casagrande et al. | 348/462 |
| 2013/0157760 A1* | 6/2013 | Boudville | 463/31 |

* cited by examiner

*Primary Examiner* — Sujoy Kundu
*Assistant Examiner* — Steven J Malone
(74) *Attorney, Agent, or Firm* — Paul W. Martin; Joseph P. Merhle

(57) ABSTRACT

A method of presenting an optical code on a display is described. The method comprises: presenting the optical code in a first format at a first time period so that the optical code can be captured and decoded by a mobile device, such as a smart phone. The method also comprises presenting the optical code in a second format at a second time period. The second format is visually different to the first format to a human but when captured and decoded by a mobile device, the second format produces the same decoded results as the first format.

14 Claims, 3 Drawing Sheets

OPTICAL CODE

FIELD OF INVENTION

The present invention relates to an optical code. In particular, although not exclusively, the invention relates to an optical code presented on a display of a self-service terminal.

BACKGROUND OF INVENTION

Self-service terminals (SSTs) are public access terminals that allow users to access information and/or transactions. A common type of SST is an automated teller machine (ATM).

It has recently been demonstrated that an ATM system can be provided that allows a user to pre-stage a dispense transaction using a networked mobile device (such as a cellular radiofrequency telephone (sometimes referred to as a cellphone)). A server stores the pre-staged dispense transaction together with an identifier of the mobile device. To execute the pre-staged transaction, the user uses an integrated camera on the mobile device to capture an image of an optical code displayed on an ATM. The mobile device decodes the optical code and transmits the optical code to the server. The server then identifies the pre-staged transaction using the mobile device identifier, and instructs the ATM identified by that optical code to dispense the funds approved in the pre-staged dispense transaction.

This system allows a user to avoid having to enter transaction details (such as the transaction amount and possibly the personal identification number (PIN)) at the ATM. This increases security and avoids the user having to touch buttons used by other members of the public.

One potential problem with this system is that it may be possible for a criminal to copy a genuine optical code from one ATM (the first ATM) and then to overlay that genuine optical code on an optical code presented by a different ATM (the second ATM). This overlay could take the form of a sticker having the optical code printed thereon, or it could take the form of an entire display that renders the optical code on a screen presented by the display.

Regardless of which way the overlay was implemented, it would have the effect that a user at the second ATM would cause the server to dispense the requested funds at the first ATM because the user would inadvertently provide the server with the optical code for the first ATM. The criminal could wait at the first ATM to receive the funds while the user stands at the second ATM without receiving any funds.

It is among the objects of an embodiment of the present invention to obviate or mitigate the above fraudulent activity, or other fraudulent activity relating to optical codes.

SUMMARY OF INVENTION

Accordingly, the invention generally provides methods, systems, apparatus, and software for providing a dynamic optical code.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of presenting an optical code on a display, the method comprising: presenting the optical code in a first format at a first time period so that the optical code can be captured and decoded by a mobile device; presenting the optical code in a second format at a second time period, wherein the second format is visually different to the first format to a human but when captured and decoded by a mobile device produces the same decoded results as the first format.

The optical code may comprise a two-dimensional (2D) barcode, such as a QR (trade mark) code.

Where the optical code is a QR code including registration marks, the second format may include a different color at one or more of the registration marks to the color at the corresponding registration marks of the first format.

Where the optical code is a 2D barcode, the first format may include black marks on a white background; whereas the second format may include a high contrast color (other than black) on a light background.

A sequence of different formats may be used in succession so that a user can see a visual transition on the optical code while he/she looks at the display.

The second format may comprise the optical code being rendered at a different spatial location on the display than the first format.

A sequence of different formats may be used in succession, each format being offset slightly (that is, spatially offset) from the last format, so that the user can see the optical code moving slowly across the display.

The second format may include a background image having a high contrast pattern and a low contrast pattern. Alternatively, the second format may include a background image having a medium contrast pattern and a low contrast pattern.

The high contrast pattern may use a different color to high contrast marks on the optical code.

The method may include exchanging high contrast portions of the optical code with high contrast portions (which may be a different color) of the background image at those areas where the high contrast portions of the background image overlap the high contrast portions of the optical code. This has the advantage that a user can see the background image superimposed on, but not interfering with, the optical code.

Alternatively, where the background image has a medium contrast pattern and a low contrast pattern, the method may include superimposing the entire background image onto the optical code. This has the advantage that the medium contrast pattern is easy to see because it covers the low contrast areas of the optical code, but does not interfere with reading the optical code (in other words, it does not add any information when the optical code is imaged then decoded).

An increasing then decreasing portion of the background image may be superimposed on the first format to give the effect that the background image is traversing the optical code, for example, from left to right, or from right to left, of from high to low, or from low to high.

The background image may be a logo or other picture. The sequence of background images may give the user the impression that the optical code is pulsing.

The background image may be superimposed over the first format of the optical code or it may surround the first format of the optical code.

The second time period may be less than one second after the first time period.

The second format may differ from the first format in any convenient manner, for example, by a difference in position, color, size, background image, or the like, provided the second format does not encode additional information to the first format.

By virtue of this aspect of the invention an optical code is provided that has a dynamic appearance. This enables the user to differentiate between an active code (that is dynamically changing) and a static code (such as would appear on a label overlayed on the display).

According to a second aspect there is provided a self-service terminal comprising: a display operable to present an optical code to a user as part of a transaction initiation process; and a controller operable to change the visual appearance of the optical code over a period of time without changing the encoded content of the optical code.

The self-service terminal may comprise an automated teller machine (ATM). The ATM may include an encrypting PINpad and a cash dispenser.

According to a third aspect there is provided a self-service terminal system comprising: a self-service terminal according to the second aspect; and a server operable to receive pre-stage transaction requests from a mobile device; wherein the server is operable to assign new optical code formats to a self-service terminal after a predefined event.

The predefined event may be when a transaction is executed using an optical code at that terminal. Alternatively, the predefined event may be when a defined time period (for example, one hour) elapses since the previous optical code formats were assigned.

The new optical code formats may be assigned to each self-service terminal coupled to the server.

The self-service terminal may comprise an automated teller machine.

The server may be operable to change the optical code formats (such as the colors and/or background image of the optical code) and may be operable to transmit the new optical code formats to the SST, and also to transmit the new optical code formats to a mobile device application. This enables the mobile device application to present the optical code format to the user on the user's mobile device so that the user can ascertain the correct format (for example, the color scheme transition) on the SST.

According to a fourth aspect there is provided a method of presenting an optical code, the method comprising: presenting the optical code in a first format at a first time period; and presenting the optical code in a second format at a second time period without changing the encoded content.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
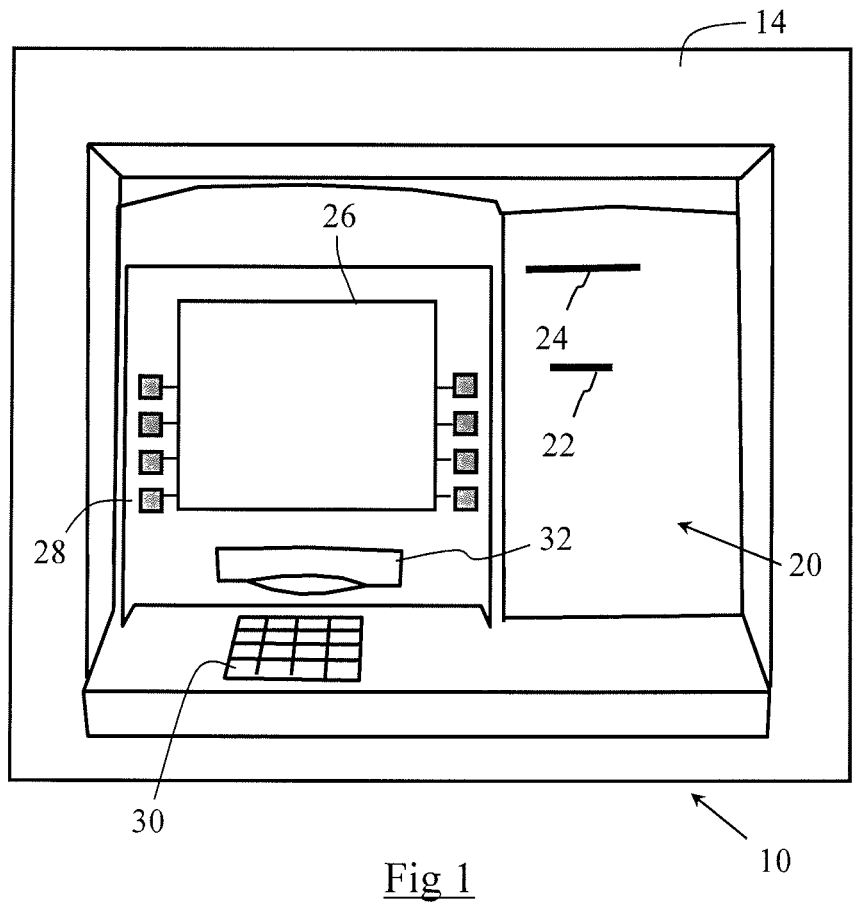
FIG. 1 is a pictorial diagram of part of an SST, in the form of an ATM, according to one embodiment of the present invention.

Reference is first made to FIG. 1, which is a pictorial front view of part of a self-service terminal 10, in the form of an ATM, according to one embodiment of the invention.

The ATM 10 includes a fascia 14, which provides part of a user interface 20 to allow a customer to interact with the ATM 10. In particular, the fascia 14 has apertures aligning with devices within the ATM 10 when the fascia 14 is in the closed position.

The user interface 20 includes: a card reader slot 22 aligning with a card reader device (not shown); a receipt printer slot 24 aligning with a receipt printer device (not shown); a display 26 and associated function display keys (FDKs) 28 disposed as two columns, each on opposing sides of the display 26; an encrypting keypad device 30; and a dispenser slot 32 aligning with a dispenser device (not shown).

Figure 2:
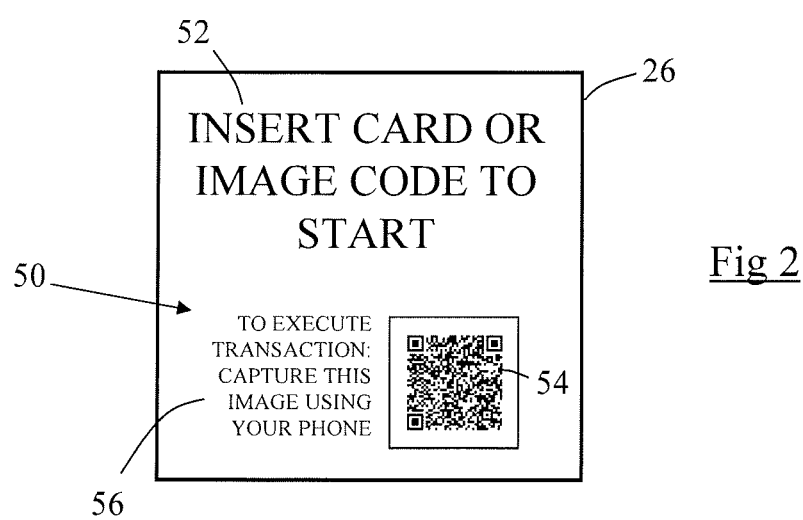
FIG. 2 illustrates part of the ATM (a display) in more detail.

As best seen in FIG. 2, the display 26 presents (or renders) a screen 50 to attract users to the ATM 10. The screen 50 includes a main text field 52 indicating to a potential user that he/she can initiate a transaction by entering an ATM card or can execute a pre-staged transaction by capturing an image of an optical code 54 presented on the screen 50. The screen 50 also includes text 56 explaining to the user how to execute a pre-staged transaction. As used herein, the word "screen" refers to software (text, controls, images, and the like); whereas the word "display" refers to hardware on which a screen is presented.

Reference will now be made to FIGS. 3A to 3D, which are pictorial diagrams of the optical code 54 in four different formats. Regardless of which format of the optical code 54 is decoded, the decoded information is always the same. In other words, the format has no effect on the information content of the decoded code.

In FIGS. 3A to 3D, the optical code 54 comprises a QR code. QR codes have three registration marks 60, 62, 64, namely: a registration mark 60 at the upper left corner, a registration mark 62 at the upper right corner, and a registration mark 64 at the lower left corner. These registration marks 60, 62, 64 do not encode any information, they are merely used to ensure that the code is correctly oriented when the image is captured and processed.

In the first format of optical code 54a (FIG. 3A), the first registration mark 60 includes a green square 70; the second registration mark 62 includes a blue square 72, and the third registration mark 64 includes a red square 74.

In the second format of optical code 54b (FIG. 3B), the ATM controller (not shown) has changed the colors in the registration marks, so that now the first registration mark 60 includes the red square 74; the second registration mark 62 includes the green square 70, and the third registration mark 64 includes the blue square 72.

In the third format of optical code 54c (FIG. 3C), the colors in the registration marks have been changed again, so that now the first registration mark 60 includes the blue square 72;

the second registration mark 62 includes the red square 74, and the third registration mark 64 includes the green square 70.

Figure 3A:
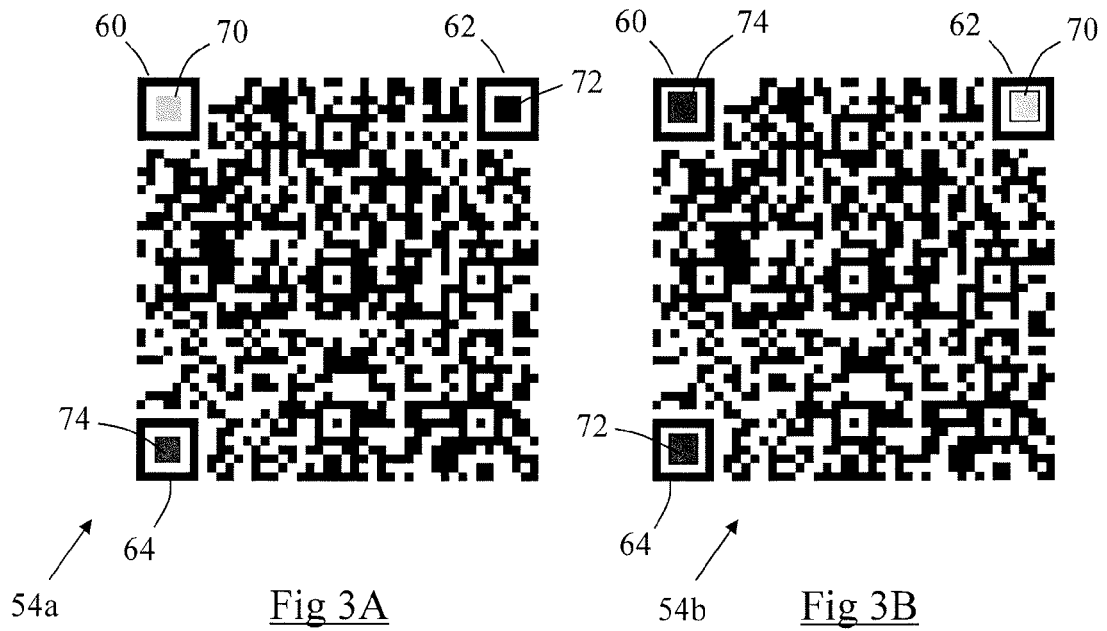
FIGS. 3A to 3D are a sequence of pictorial diagrams illustrating different formats of an optical code presented in succession on a display of the ATM of FIG. 1.
Figure 3B:
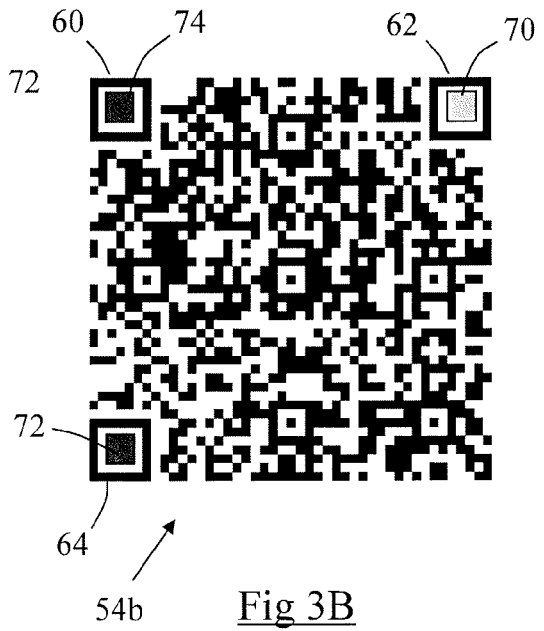
Figure 3C:
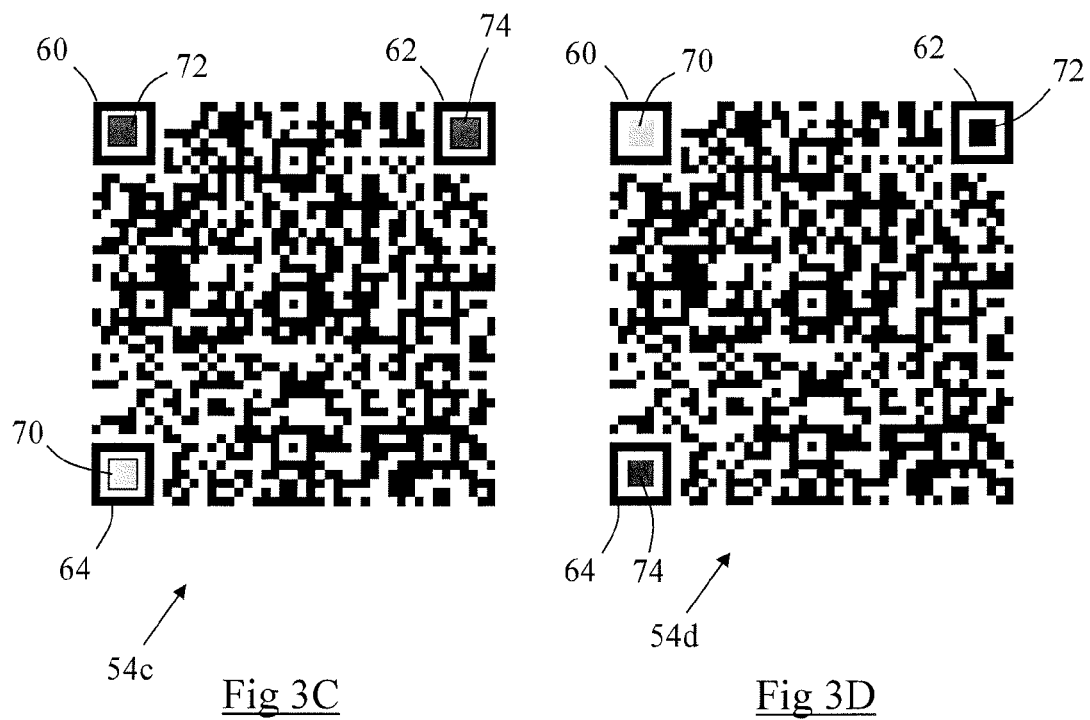
Figure 3D:
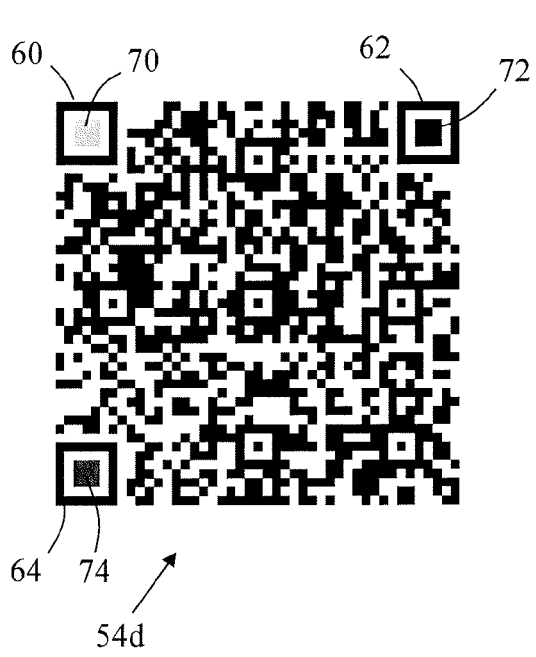

The fourth format of optical code 54d (FIG. 3D) is the same as the first format of optical code 54a (FIG. 3A).

In this embodiment, each format of optical code 54 is presented on the screen 50 for approximately one second, so that a user observes the colors changing within the registration marks 60, 62, 64 every second. This gives the user reassurance that the optical code 54 is genuine.

The screen 50 (or the fascia 14 of the ATM 10) may also include text informing the user that if the colors in the registration marks 60, 62, 64 on the optical code 54 do not change, then not to use the optical code 54.

Figure 4:
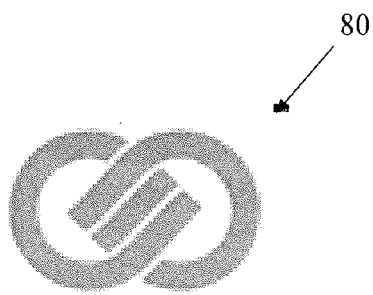
FIG. 4 is a pictorial representation of a background image for superimposing on an optical code to create a sequence of different formats of optical code.

There are other ways of ensuring that an optical code changes dynamically. One other way will now be described with reference to FIG. 4 and FIGS. 5A to 5G. FIG. 4 shows a background image 80 that will be superimposed on an optical code 84 in such a way that the background image 80 will appear to traverse the optical code 84. FIGS. 5A to 5G, which are a sequence of pictorial diagrams illustrating different formats of the optical code 84 presented in succession on the display 26.

In FIG. 4, a background image 80 is illustrated. In this embodiment, the background image comprises a green-colored logo for NCR Corporation (trade mark).

The ATM 10 incorporates this background image 80 into the optical code 84 in such a way that the background image 80 appears to enter the optical code 84 from the left side, traverse the optical code 84 from left to right, and then exit the optical code 84 from the right side. Although this may be implemented in a continuous manner over a relatively short period of time (for example seven seconds), for illustration purposes this is shown in seven stages in FIGS. 5A to 5G.

Initially, the ATM 10 presents on the display 26 the optical code 84a (FIG. 5A), which does not include any part of the background image 80.

After a short time period (for example one second), the ATM 10 presents the second format optical code 84b (FIG. 5B) on the display 26, which includes a right-hand portion of the background image 80. It should be appreciated that the colors on the background image are low contrast (white background to logo) and medium contrast (green foreground logo). This ensures that when a binary image is captured the background image 80 does not appear on the binary image. This ensures that the optical code 84b can be accurately captured and decoded by a mobile device.

After another short time period (for example another second), the ATM 10 presents the third format optical code 84c (FIG. 5C) on the display 26. The third format optical code 84c includes a greater part of the right-hand portion of the background image 80 than the second format optical code 84b.

Figure 5A:
FIGS. 5A to 5G are a sequence of pictorial diagrams illustrating different formats of an optical code presented in succession on a display of the ATM of FIG. 1 using the background image of FIG. 4.
Figure 5B:
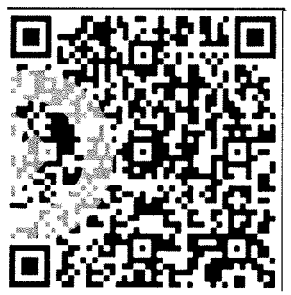
Figure 5C:
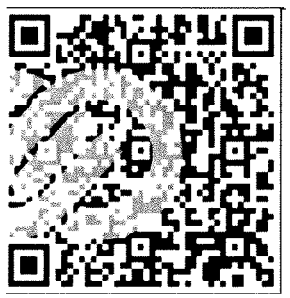
Figure 5D:
Figure 5E:
Figure 5F:
Figure 5G:

This succession of formats of optical code continues (as shown in FIGS. 5D to 5F) until the background image 80 is no longer visible on the first format optical code 84g (FIG. 5G). In other words, FIG. 5A is identical to FIG. 5G.

The ATM 10 then repeats the process (returning to FIG. 5A).

A customer at the ATM 10 will see the logo appearing to traverse the optical code 84 from left to right; thereby providing assurance that the optical code 84 is genuine.

Various modifications may be made to the above described embodiments within the scope of the invention, for example, in other embodiments, the optical code may be a 2D barcode other than a QR code, such as a Data Matrix code.

In other embodiments, the ATM (or other SST) may move the optical code to different positions on the screen 50 over time. This may be in addition to other changes in the optical code, such as different colors for the registration marks, a background image traversing the optical code, a background image being permanently visible in the optical code but changing in size, color, or the like.

In other embodiments, a background image may be provided that changes its size, shape, or color while remaining within a perimeter of the optical code. For example, a background image may be provided that appears to a customer to pulse, rotate, or the like.

In other embodiments, the SST may be a check-in or check-out terminal, or other type of self-service terminal, rather than an ATM.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of presenting an optical code on a display, the method comprising:
   presenting the optical code in a first format at a first time period so that the optical code can be captured and decoded by a mobile device;
   presenting the optical code in a second format at a second time period;
   wherein the second format is visually different from the first format to a human but the optical code is captured and decoded by the mobile device in the same way to produce the same decoded results in the second format as in the first format; and
   presenting text included with the optical code that informs the human that if the optical code does not change between the first format and the second format then the human should not use the optical code.

2. The method of claim 1, wherein the optical code comprises a two-dimensional barcode.

3. The method of claim 2, wherein the optical code comprises a QR code including registration marks, and the second format includes a different color at one of the registration marks to the color at the corresponding registration marks of the first format.

4. The method of claim 2, wherein the first format includes only black marks on a white background; whereas the second format includes a high contrast color, other than black, on a light background.

5. The method of claim 1, wherein a sequence of different formats are used in succession so that a user can see a visual transition on the optical code while he/she looks at the display.

6. The method of claim 1, wherein the second format comprises the optical code being rendered at a different spatial location on the display than the first format.

7. The method of claim 6, wherein a sequence of different formats are used in succession, each format being spatially offset from the last format, so that the user can see the optical code moving across the display.

8. The method of claim 1, wherein the second format includes a background image having a medium contrast pattern and a low contrast pattern.

9. The method of claim 8, wherein the medium contrast pattern on the background image uses a different color to high contrast marks on the optical code.

10. The method of claim 9, wherein the method includes superimposing medium contrast portions of the background image onto the first format optical code to create the second format optical code.

11. The method of claim 10, wherein the background image is advanced in sequence to give the effect that the background image is traversing the optical code.

12. The method of claim 8, wherein the background image comprises a logo.

13. A self-service terminal comprising:
   a display operable to present an optical code to a user as part of a transaction initiation process; and
   a controller operable to change a visual appearance of the optical code over a period of time without changing encoding and the encoded content of the optical code and including text with the optical code informing a user that if the change in visual appearance does not occur then the user should not use the optical code.

14. A self-service terminal according to claim 13, wherein the terminal further comprises a cash dispenser.

* * * * *